3,784,489
ANION EXCHANGE RESINS FROM ALKYLATED CONDENSATION POLYMERS OF POLYETHYLENEIMINE AND DIHALOALKANES
Mark Dales, 1114 Churchill Road, Southampton, Pa. 18966, and Jong Jai Whang, 294-18 Fee-Kyong Bong, Bong-Dae-Moon-Gu, Seoul 131, South Korea
No Drawing. Filed Mar. 6, 1972, Ser. No. 232,272
Int. Cl. C08g 33/08
U.S. Cl. 260—2.1 C         13 Claims

ABSTRACT OF THE DISCLOSURE

Anion exchange resins are produced by (a) condensing polyethyleneimine with at least one dihaloalkane, followed by (b) reacting the product of (a) with an alkylating agent to convert substantially all of the nontertiary amine groups in (a) to tertiary or quaternary amine groups.

---

This invention relates to condensation polymers of polyethyleneimine and dihaloalkanes which are useful as anion exchange resins.

Certain condensation polymers of polyethyleneimine have been described in the prior art. However, these resins, prepared by heating a mixture of polyethyleneimine and a dihaloalkane have several serious deficiencies, including unduly granular or lumpy texture and development of a very high rinse requirement when used in purifying water. Condensation polymers of polyethyleneimine and dihaloalkanes, having a high anion exchange capacity, which overcome these deficiencies have now been found.

According to the invention, useful anion exchange resins are prepared by (a) condensing polyethyleneimine with at least one dihaloalkane, followed by (b) reacting the product of (a) with an alkylating agent, preferably a methylating agent, to convert substantially all of the nontertiary amine groups in (a) to tertiary or quaternary amine groups. The polyethyleneimine used in preparing the resins of the invention can have any of a wide range of molecular weights, and substantially any conveniently available polyethyleneimine or equivalent will be suitable. As used in the present specification and claims, the term polyethyleneimine also includes polymers having the polyethyleneimine structure prepared by indirect means, such as condensation polymers of polyethylene polyamines and the like. Generally, the polyethyleneimine used in making the resins of the invention will have an average molecular weight of about 300 to about 60,000, and preferably about 600 to about 5000.

A wide variety of dihaloalkanes can be used in preparing the resins of the invention. Among the useful dihaloalkanes are $(C_1-C_6)$ dihaloalkanes, such as 1,2-dichloroethane (ethylene dichloride), 1,2-dichloropropane, 1,3-dichloropropane, 1,2-dichlorobutane, 1,3-dichlorobutane, 1,4-dichlorobutane, 1,4-dichlorobutene, 1,6-dichlorohexane, and the corresponding bromides or iodides. Also included among the useful dihaloalkanes are dihaloaralkanes, such as bis(chloromethyl) benzene, and the like. Mixtures of dihaloalkanes can also be used. A preferred dihaloalkane is ethylene dichloride.

The ratio of the polyethyleneimine to the dihaloalkane can be varied over a wide range, depending on the degree of crosslinking which is desired in the resin. An increase in the ratio of dihaloalkane to polyethyleneimine will usually provide an increase in the degree of crosslinking. Generally, about 0.1 to about 0.6 mole, and preferably about 0.15 to about 0.45 mole, of the dihaloalkane per equivalent ethyleneimine unit in the polyethyleneimine will be used in preparing the polymers of the invention.

Any of the conventional condensation polymerization processes known in the art can be used in making the polyethyleneimine-dihaloalkane resins of the invention. Generally, the polyethyleneimine is dissolved in water and added to the dihaloalkane and a suspending agent dissolved in a suitable solvent, such as a hydrocarbon or chlorinated hydrocarbon, which is inert to the condensation reaction. The reaction is generally carried out at a temperature of about 70 to about 140° C., and preferably about 85 to about 125° C. The reaction can be carried out at atmospheric pressure, or at superatmospheric pressures of generally up to about 2 or 3 atmospheres. Under some conditions, running the reaction at superatmospheric pressures will advantageously increase the incorporation of the dihaloalkane and lower the number of secondary amine groups in the precursor resin.

While the condensation reaction can be carried out without the use of a catalyst, an organic or inorganic base, such as sodium hydroxide, sodium carbonate, calcium hydroxide, sodium acetate, sodium phosphate, or the like may facilitate the reaction. When a catalyst is used, generally about 0.125 to about 1.0 mole per equivalent ethyleneimine unit is most efficient, although any quantity which gives the desired catalysis can be used. In a preferred process for making the resins of the invention, a delayed addition of the catalyst is used.

After the condensation of polyethyleneimine and the dihaloalkane, the resin formed by this reaction is treated with an alkylating agent, preferably a methylating agent, to convert substantially all of the nontertiary amine groups in the precursor resin to amine groups which are tertiary or quaternary. Two general types of alkylation reaction are generally employed—exhaustive alkylation and reductive alkylation.

The reductive alkylation reaction which is preferred is the Leuckart reaction, in which the nontertiary amine groups react with formaldehyde and formic acid to form the corresponding N-methyl tertiary amine group. While the reaction can be run on the isolated precursor resin itself, it is generally carried out on the precursor resin in the partial chloride form from which organic solvents have been removed without prior isolation. The reaction is generally carried out at a temperature of about 25 to about 100° C., preferably about 55 to about 90° C.

Procedures for carrying out this reaction are well known in the art. In one useful procedure, formaldehyde is added to an aqueous slurry of the precursor resin, and, after allowing a sufficient reaction period for the formation of the formyl intermediate, generally about ½ to 2 hours, formic acid is added to the reaction mixture. For the nontertiary amine groups in the precursor resin to be substantially completely methylated, generally at least about 2 moles of formaldehyde and formic acid will be necessary for each equivalent of secondary amine in the precursor resin. Any other reductive alkylation reaction for converting nontertiary amine groups to tertiary amine groups which will not significantly interfere with the anion exchange properties of the precursor resin can also be used.

Various exhaustive alkylation techniques which are well-known in the art can be used to convert the nontertiary amine groups in the precursor resin to tertiary and quaternary amine groups. A preferred technique is the reaction of the precursor resin with an exhaustive alkylating agent. Suitable alkylating agents include alkyl halides, such as methyl, ethyl or propyl chlorides, bromides, and iodides, alkyl sulfates, such as sulfate, alkylene oxides, such as ethylene oxide, epichlorohydrin, or the like. In one useful procedure, the alkylating agent is added to an aqueous slurry of the precursor resin at a temperature of about 20 to about 125° C., optionally in the presence of a basic catalyst, such as sodium or potassium hydroxide, sodium carbonate, magnesium or calcium oxide, or an organic amine, such as pyridine. A suitable molar excess of the alkylating agent is used to insure conversion of all amine groups to tertiary or quaternary groups. Other procedures for carrying out exhaustive alkylation reactions are well known in the art.

The resins of the invention are useful as weak base anion exchange resins, and exhibit very high capacity with good stability, and are particularly suitable, for example, for removing strong acids from various aqueous systems. The resins formed by the exhaustive alkylation of the precursor resin will contain both tertiary and quaternary amine groups, and thus will possess both weak base and strong base anion exchange capacity.

The following examples are set forth to illustrate further this invention but are not intended to limit it in any way.

EXAMPLES 1 TO 5

Preparation of precursor resin (1) Into a 5-liter, 3-neck flask equipped with a condenser, thermometer, and paddle-type stirrer are charged 2067 grams of chlorobenzene, 623 grams of ethylene dichloride, and 15 ml. of suspending agent (7% solution in chlorobenzene of the diester of polybutenylsuccinic acid and N-(2-hydroxyethyl)-2-morpholinone). To the flask is then added a solution of 533.2 grams of polyethyleneimine having an average molecular weight of 1800 (PEI-18, commercially available from Dow Chemical Co.) in 990.2 grams of deionized water. The reaction mixture is heated with stirring to about 89° C. over a two-hour period, and held at that temperature for about 20 hours. After heating the reaction mixture at about 92 to 94° C. for one hour, chlorobenzene and unreacted ethylene dichloride are stripped, while adding water to the flask to maintain an approximately constant volume. After solvent and unreacted starting material have been removed, 30 grams of gelling agent (Attagel 50) is added, the reaction mixture is cooled to about 50° C., 400 grams of 50% sodium hydroxide solution is added, and the reaction mixture held at about 50° C. for an hour. After cooling to room temperature, the reaction mixture is backwashed and regenerated to yield 2510 grams (wet) of 24.0% solids resin in the free base form.

(2) To a mixture of 250 ml. of o-dichlorobenzene, 100 grams of 1,6-dibromohexane, and 0.75 ml. of suspending agent in a 1-liter flask are added 50 grams of polyethyleneimine (average molecular weight 1800) in 50 grams of deionized water. Following the procedure of Example 1, with heating overnight at about 85 to 95° C., the reaction yields 360 grams (wet) of resin after backwashing and regeneration.

(3) Into a 5-liter stainless steel pressure reactor equipped with a thermometer, temperature control, heating mantle, addition funnel, and stainless steel paddle-type stirrer are charged 550 grams of ethylene dichloride, 1500 grams of chlorobenzene, and 22 ml. of suspending agent. Over a period of about one hour is added with stirring 718 grams of 60% aqueous polyethyleneimine having an average molecular weight of 600 (PEI-6), commercially available from Dow Chemical Co.) while maintaining the temperature at about 25° C. The reaction mixture is heated to about 85° C. over a two-hour period, and allowed to remain at 85° C. for another 4 hours. After cooling the reaction mixture to about 70° C., 615 grams of 30% aqueous calcium hydroxide slurry is added. The reactor is then closed and heated to about 120° C. at a pressure of about 40 to 45 p.s.i. for 14 hours. The reaction mixture is cooled to 90° C. and the solvent and unreacted starting material are stripped off and replaced with water. After cooling to room temperature, the reaction mixture is backwashed and regenerated to give the wet resin in the free base form.

(4) Into a 5-liter stainless steel pressure reactor equipped as in Example 3 are charged 550 grams of ethylene dichloride, 1500 grams of chlorobenzene, and 33 ml. of suspending agent. Into the addition funnel are placed 430 grams of polyethyleneimine having an average molecular weight of 1800 (PEI-18, commercially available from Dow Chemical Co.) and 287 grams of deionized water and the temperature adjusted to about 30 to 40° C. The aqueous polyethyleneimine solution is then gradually added to the reactor over a period of about 1 hour while maintaining the temperature in the reactor at about 35° C. The temperature in the reactor is increased gradually to about 85° C. and allowed to remain at about 85° C. for another 5 hours. After cooling the reaction mixture to about 70° C., to it are added 185 grams of calcium hydroxide and 20 grams of 50% aqueous sodium hydroxide in 700 grams of deionized water. The reaction mixture is heated to about 120° C. over a 1-hour period and held at 120° C. for about 5 hours. When the reaction mixture has cooled to 40° C., it is transferred to a 5-liter 3-neck glass flask and the chlorobenzene and unreacted ethylenedichloride are azeotropically distilled from the mixture over a temperature range of about 85 to 102° C. During the distillation, water is added to the flask to maintain an approximately constant volume in the flask. After the distillation is completed, 25 grams of gelling agent (Attagel 50) are added. Backwashing and regenerating the reaction mixture with 5% sodium hydroxide solution gives the wet resin in its free base form.

(5) Following the procedures of Examples 1 to 4, anion exchange resins are prepared using polyethyleneimines having average molecular weights of 1200, 4000, 5000, and 60,000, and using as dihaloalkanes 1,3-dichloropropane, 1,4-dichlorobutene-2, a mixture of ethylene dichloride and 1,4-dichlorobutane, and 1,2-dichloropropane.

EXAMPLE 6

Reductive methylation of precursor resin

This example shows one suitable technique for carrying out the reductive alkylation of the precursor polyethyleneimine-dihaloalkane resin.

Following the procedure of Example 4, the precursor resin is prepared. After the gelling agent has been added, the temperature of the reaction mixture is adjusted to about 25° C. and to it is added 610 grams of 27% formaldehyde. The reaction mixture is allowed to equilibrate at about 25° C. for about an hour, and 430 grams of 90% formic acid is then added slowly over a ½-hour period. The flask is heated to 55° C. over a 1-hour period and after being held for 1 hour at 55° C. is heated to 75° C., held for 3 hours, heated to 90° C., and held for about 2½ hours. After cooling to room temperature, the reaction mixture is charged to a backwash tower where it is backwashed and regenerated.

The reaction yields a stable weak base ion exchange resin (34.9% solids) having a total anion exchange capacity of 12.5 meq./g.

EXAMPLE 7

Exhaustive methylation of precursor resin

This example shows one suitable procedure for carrying out the exhaustive alkylation of the precursor polyethyleneimine-dihaloalkane resin.

To a 5-liter stainless steel pressure reactor at 25° C. are charged 100 grams of precursor resin (33.9% solids, prepared as in Example 4), 500 grams of deionized water, and 40 grams of sodium carbonate. The reactor is then pressurized to 50 p.s.i. with an excess molar amount of methyl chloride. After being held at about 25° C. for 20 hours, the unreacted methyl chloride is removed and the reaction mixture is backwashed and regenerated to yield 114 grams (wet) of 54.5% solids resin in the free base form, having an 87.5% quaternization based on increase in weight. This resin shows both strong base and weak base anion exchange capacity.

When methyl bromide, methyl sulfate, ethyl chloride, and ethylene oxide are used as alkylating agents, similar exhaustively alkylated anion exchange resins are obtained.

It is to be understood that changes and variations may be made without departing from the spirit and scope of the invention as defined by the appended claims.

What is claimed is:

1. An ion exchange resin which is the product of (a) reacting polyethyleneimine with a dihaloalkane followed by (b) reacting the product of (a) with a reductive alkylating agent to convert substantially all of the nontertiary amine groups in (a) to tertiary amine groups.

2. An ion exchange resin according to claim 1 wherein the polyethyleneimine has an average molecular weight of about 300 to about 60,000.

3. An ion exchange resin according to claim 2 wherein the dihaloalkane is a $(C_1-C_6)$ dichloroalkane or dibromoalkane.

4. An ion exchange resin according to claim 3 wherein the dihaloalkane is ethylene dichloride.

5. An ion exchange resin according to claim 3 wherein the alkylating agent is formaldehyde and formic acid.

6. An ion exchange resin according to claim 5 wherein the polyethyleneimine has an average molecular weight of about 600 to about 5000 and the dihaloalkane is ethylene dichloride.

7. A method of preparing an ion exchange resin which comprises (a) condensing polyethyleneimine with a dihaloalkane followed by (b) reacting the product of (a) with a reductive alkylating agent to convert substantially all of the nontertiary amine groups in (a) to tertiary amine groups.

8. A process according to claim 7 wherein the polyethyleneimine has an average molecular weight of about 300 to about 60,000.

9. A process according to claim 8 wherein the dihaloalkane is a $(C_1-C_6)$ dichloroalkane or dibromoalkane.

10. A process according to claim 9 wherein the dihaloalkane is ethylene dichloride.

11. A process according to claim 9 wherein the alkylating agent is formaldehyde and formic acid.

12. A process according to claim 11 wherein (b) is carried out at a temperature of about 25 to about 100° C.

13. A process according to claim 11 wherein the polyethyleneimine has an average molecular weight of about 600 to about 5000 and the dihaloalkane is ethylene dichloride.

References Cited

UNITED STATES PATENTS 2,912,390  11/1959  Jaruzelski _____ 260—2.1

FOREIGN PATENTS 160,132  2/1941  Germany.

OTHER REFERENCES

Saber: Diss. Abistr. 26, 2505 (1965).

MELVIN GOLDSTEIN, Primary Examiner

U.S. Cl. X.R.

260—2.1 R

UNITED STATES PATENT OFFICE
CERTIFICATE OF CORRECTION

Patent No. 3,784,489            Dated January 8, 1974

Inventor(s) Mark Dales and Jong Jai Whang

It is certified that error appears in the above-identified patent and that said Letters Patent are hereby corrected as shown below:

In the specification make the following change:

Column 3, line 44, "o-dichlorobenzene" should read
                  --*o*-dichlorobenzene--

Signed and sealed this 16th day of July 1974.

(SEAL)
Attest:

McCOY M. GIBSON, JR.            C. MARSHALL DANN
Attesting Officer                Commissioner of Patents